April 7, 1925.
C. E. DURHAM
BEARING
Filed March 9, 1921
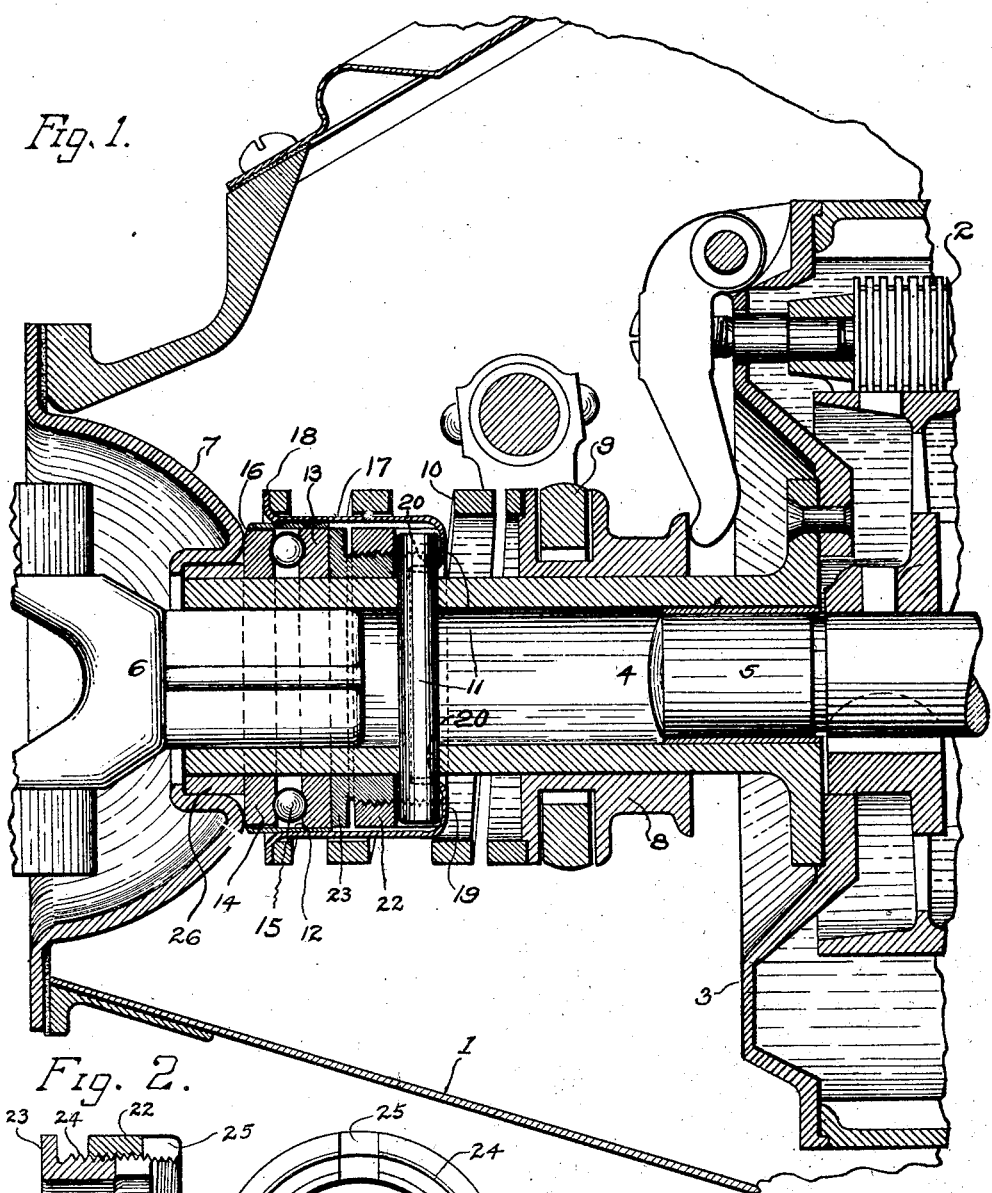
Fig. 1.
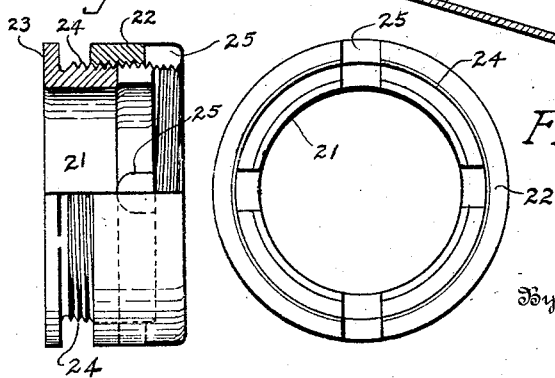
Fig. 2.
Fig. 3.
Inventor
CARROLL E. DURHAM
By
Attorneys Patented Apr. 7, 1925.

1,532,993

UNITED STATES PATENT OFFICE.

CARROLL E. DURHAM, OF REDFORD TOWNSHIP, WAYNE COUNTY, MICHIGAN, ASSIGNOR OF ONE-HALF TO THOMAS B. MOORE, OF DETROIT, MICHIGAN.

BEARING.

Application filed March 9, 1921. Serial No. 450,822.

*To all whom it may concern:*

Be it known that I, CARROLL E. DURHAM, a citizen of the United States of America, residing in the township of Redford, in the county of Wayne and State of Michigan, have invented certain new and useful Improvements in Bearings, of which the following is a specification, reference being had therein to the accompanying drawings.

If the engine shaft of an automobile, truck or similar vehicle is not firmly held against longitudinal movement there is rattle, noise, and destructive wear and such slipping and slapping of the engine crank shaft causes rapid deterioration of the power plant. Many troubles about an automobile may be attributed to rearward end thrust of an engine crank shaft, a transmission shaft, or any shaft in the line drive of an automobile. For instance, constant end thrust on engine bearings and bushings permits end play of vital engine parts. Timing gears, connecting rods, pistons, magneto parts, transmission gears, and brake and clutch mechanism may be affected unless an engine crank shaft is positively held against rearward end thrust, and my invention aims to correct and improve the mounting of an engine crank shaft by a novel bearing that may be used at various places about an automobile, but more particularly between the rear extending drive and crank or transmission shaft of the power plant.

My bearing is of the self centering and anti-frictional type and the bearing includes a novel adjustable spacer member which permits of the bearing being properly fitted in a transmission casing or housing to prevent end thrust of a transmission or engine crank shaft extending therein. As there may be slight variations in the size or location of parts with which the bearing is associated, the bearing has been made adjustable so that there cannot be any lost motion when the bearing is properly installed.

My invention further aims to provide a bearing which is a bench assembled proposition and may be easily and quickly adjusted so as to properly fit in a clutch spring casing, serve as an end abutment therefor, and firmly engage the usual universal joint cap at the end of the transmission casing of the power plant. The bearing may be constructed, as a unitary device to include the spring casing and be handled as an automobile accessory, so that when an automobile or similar vehicle is overhauled, the bearing may be installed to eliminate the above mentioned and other troubles experienced in certain types of automobiles. Then again the bearing may be made to fit in the usual spring casing and replace the bushing which usually extends therein.

The construction entering into my invention will be hereinafter described by aid of the drawing, wherein Figure 1 is a longitudinal sectional view of the bearing showing its location within a transmission housing;

Fig. 2 is a side elevation, partly broken away and partly in section, of an adjustable spacer member; and Fig. 3 is an end view of the same.

In order that my bearing may be understood when used in connection with a well known type of automobile power plant, there is shown in the drawing, a portion of a transmission casing or housing 1 containing a clutch mechanism 2 which includes a transmission drive plate assembly 3 provided with a sleeve, or power transmission member 4 into which extends an engine crank shaft 5 and a portion of a universal joint 6 forming part of a rearwardly extending drive shaft (not shown). The universal joint 6 is ordinarily located in a front ball cap or end abutment 7 into which the sleeve 4 extends, and on said sleeve is a slidable clutch 8 adapted to be shifted by a release fork 9 forming part of the clutch control. The clutch shift 8 is normally engaged by a coiled compression spring 10 encircling the sleeve 4, and it is on this sleeve and in the spring 10 that my improved bearing is placed, and associated with a clutch pin or abutment 11 extending transversely of the sleeve 4 with its ends protruding therefrom. Ordinarily there is a bushing 26 in the ball cap or abutment 7 which extends into a spring supporting casing 17, but this bushing is made shorter or dispensed with so that the bearing may be easily installed in the casing 17.

The bearing comprises a cylindrical sheet metal cage 12, containing an inner fixed ball race member 13 and an outer movable ball race member 14 with a series of balls 15 interposed between said race members. The outer end of the cage 12 is peened or inturned, as at 16, so as to retain the movable ball race member 14, within the cage, and permit of the cage, as a unit, being assembled relative to the spring casing 17.

The cage 12 is fitted in the outer end of the cylindrical casing 17 and said casing has a peripheral end flange 18 serving as an end abutment for the clutch spring 10, said spring surrounding the casing 17. The opposite end of the casing 17 is provided with an inturned annular flange 19 which is in proximity to the sleeve 4, and the inturned end of the flange 19 has a series of notches 20 so that diametrically opposed notches may receive the protruding ends of the pin or abutment 11, and thus prevent rotation of the casing 17 relative to the sleeve 4.

Interposed between the ball race member 13 and the inturned end of the casing 17 is an adjustable spacer member, composed of an inner member 21 and an outer member 22. The inner member 21 has an end flange 23 abutting the movable ball race member 13 and said inner member is exteriorly screwthreaded as at 24, to receive the outer member 22, these screwthreads permitting of the outer member being adjusted relative to the inner member so as to increase or decrease the longitudinal dimension of the spacer member. Both members have the ends thereof provided with a series of notches 25, preferably two in the outer member and four in the inner member, and the notches of the outer member are adapted to aline or register with notches of the inner member, whereby these notches may provide clearance for the spring pin 11, as best shown in Fig. 1.

The manner in which the inner and outer members 21 and 22 are articulated permits of the spacer member being adjusted so that said member and the ball bearing cage may be accurately fitted between the ball cap 7 and the pin 11, and with the protruding ends of the pin 11 bearing against the end of the spacer member, or said spacer member against the casing flange 19, any thrust on the sleeve 4 will be received by the balls 15 within the cage 12 and the ball race member 14 bearing against the cap 7. Since there may be end pressure against the ball race member 14, this ball race member will be held stationary against the cap 7 and the ball race member 13, cage 12, spacer member, and casing 17 will revolve as a unit in synchronism with the sleeve 4. It is now apparent that the adjustable spacer member may have its component parts properly positioned so as to fill the gap between the anti-frictional bearing and the pin 11, and thus prevent lost motion.

What I claim is:—

1. In a transmission assembly which includes a drive plate assembly sleeve, a ball cap, and a spring casing:—an end thrust bearing extending into the spring casing against said ball cap and adapted to receive end thrust of said sleeve, and an adjustable spacer member forming part of said bearing.

2. The combination with a drive plate assembly sleeve, a ball cap, a spring casing, and a sleeve pin holding said spring casing relative to said sleeve, of a bearing extending into said casing and abutting said ball cap, and adjustable means in said spring casing maintaining said bearing against said ball cap.

3. The combination with a power transmission member, a pin carried thereby, and an end abutment, of a spring abutment casing on said power transmission member, and an end thrust bearing in said spring abutment casing and having adjustable parts by which its longitudinal dimension may be increased to snugly fit between said pin and said abutment.

4. The combination of a power transmission member having an abutment, an end abutment in opposed relation to said member abutment, and an end thrust bearing between said abutments and having adjustable parts by which its longitudinal dimension may be increased or decreased to snugly fit between said abutments.

5. In a transmission assembly including a bearing, a casing about said bearing, and a pin transverse to the longitudinal axis of the assembly:—means for maintaining said bearing in spaced relation to said pin, said means being composed of adjustable parts housed within said casing and having a configuration to engage said pin, and prevent accidental adjustment of one part relative to the other.

6. In a transmission assembly including a bearing, and a pin transverse to the longitudinal axis of the assembly:—means maintaining said bearing in spaced relation to said pin with said means having a configuration to receive said pin so that said means will be held for rotation with said pin.

7. In a thrust bearing for the shafting of automobiles, the combination with a shaft, a clutch spring support mounted thereon and the front universal housing part, of an end thrust bearing attachment having co-acting elements mounted respectively on said housing part and on the shaft free of said spring support.

8. In a motor vehicle, a crank shaft, a universal joint housing, transmission means in said housing, a clutch spring pin associated with the crank shaft, a cylindrical member having its front end notched to engage said clutch spring pin, and a thrust bearing between the rear end of said cylindrical member and said housing.

In testimony whereof I affix my signature in presence of two witnesses.

CARROLL E. DURHAM.

Witnesses:
  OTTO F. BARTHEL,
  ANNA M. DORR.